United States Patent
Duckworth

(10) Patent No.: US 10,260,193 B2
(45) Date of Patent: Apr. 16, 2019

(54) DRYER APPLIANCE AND A METHOD FOR FORMING A UNITARY COMPONENT WITH A MOISTURE SENSOR

(71) Applicant: General Electric Company, Schenectady, NY (US)

(72) Inventor: Phillip John Duckworth, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 287 days.

(21) Appl. No.: 15/057,167

(22) Filed: Mar. 1, 2016

(65) Prior Publication Data

US 2017/0254015 A1 Sep. 7, 2017

(51) Int. Cl.
| | |
|---|---|
| F26B 19/00 | (2006.01) |
| D06F 58/28 | (2006.01) |
| D06F 58/02 | (2006.01) |
| D06F 58/22 | (2006.01) |
| B33Y 10/00 | (2015.01) |
| B33Y 80/00 | (2015.01) |

(52) U.S. Cl.
CPC ............. *D06F 58/28* (2013.01); *B33Y 10/00* (2014.12); *B33Y 80/00* (2014.12); *D06F 58/02* (2013.01); *D06F 58/22* (2013.01); *D06F 2058/2822* (2013.01); *D06F 2058/2829* (2013.01)

(58) Field of Classification Search
CPC .. D06F 58/22; D06F 58/2816; D06F 58/2819; D06F 58/2822; D06F 58/2825; B33Y 80/10; B33Y 10/00
USPC .............................................. 34/528
See application file for complete search history.

(56) References Cited

U.S. PATENT DOCUMENTS

| | | | |
|---|---|---|---|
| 5,940,986 A * | 8/1999 | Jelinek | D06F 58/04 34/528 |
| 2017/0136692 A1* | 5/2017 | Zheng | B29C 67/0059 |

FOREIGN PATENT DOCUMENTS

EP 2584086 A1 4/2013

\* cited by examiner

*Primary Examiner* — John P McCormack
(74) *Attorney, Agent, or Firm* — Dority & Manning, P.A.

(57) ABSTRACT

A method for forming a unitary component with a moisture sensor is provided. The method includes establishing three-dimensional information of the unitary component, converting the three-dimensional information into a plurality of slices, and successively forming each slice of the unitary component with an additive process. The moisture sensor of the unitary component includes a first conductive lead and a second conductive lead. A related dryer appliance is also provided.

17 Claims, 4 Drawing Sheets

DRYER APPLIANCE AND A METHOD FOR FORMING A UNITARY COMPONENT WITH A MOISTURE SENSOR

FIELD OF THE INVENTION

The present subject matter relates generally to moisture sensors for dryer appliances.

BACKGROUND OF THE INVENTION

Accurately measuring moisture content of clothing being dried within a dryer appliance can improve performance of the dryer appliance. For example, the dryer appliance can be operated until the measured moisture content of the clothing falls below a desired amount. A heater or other appropriate components of the dryer appliance can be deactivated when the measured moisture content of the clothing falls below the desired amount.

Certain existing dryer appliances use two metal rods in close proximity to each other to detect available moisture in the clothing. As the clothing tumbles within the dryer appliance, the clothing bridges the two metal rods, and a response of a circuit coupled to the two metal rod changes. The response of the circuit can be correlated to the moisture content of the clothing. Generally, the two separately formed metal rods are mounted to a non-conductive, plastic component in order to electrically isolate the two metal rods from each other.

Utilizing the two metal rods to measure moisture content has certain drawbacks. For example, the two metal rods can provide limited sensing area within the dryer appliance. As another example, physical contact between the two metal rods and the clothes being dried is required for accurate readings. Therefore, the two metal rods are generally positioned on non-rotating components of the dryer, but accurate moisture content measurements with the two metal rods at such locations can be difficult because the clothing being dried is less probable to contact non-rotating components of the dryer appliance than rotating components.

Accordingly, a dryer appliance with features for accurately measuring moisture content of clothing within the dryer appliance would be useful. In particular, a dryer appliance with features for increasing contact frequency between a moisture sensor and clothing within the dryer appliance would be useful.

BRIEF DESCRIPTION OF THE INVENTION

The present subject matter provides a method for forming a unitary component with a moisture sensor. The method includes establishing three-dimensional information of the unitary component, converting the three-dimensional information into a plurality of slices, and successively forming each slice of the unitary component with an additive process. The moisture sensor of the unitary component includes a first conductive lead and a second conductive lead. A related dryer appliance is also provided. Additional aspects and advantages of the invention will be set forth in part in the following description, or may be apparent from the description, or may be learned through practice of the invention.

In a first exemplary embodiment, a dryer appliance is provided. The dryer appliance includes a cabinet. A drum is rotatably mounted within the cabinet. The drum defines a drying chamber. A vent grill is positioned at the drying chamber of the drum such that air in the drying chamber of the drum is flowable through the vent grill. The vent grill includes a grating. A moisture sensor includes a first conductive lead and a second conductive lead. The first and second conductive leads are additively formed with the grating of the vent grill such that the first and second conductive leads do not contact each other on the grating.

In a second exemplary embodiment, a method for forming a unitary component with a moisture sensor is provided. The method includes establishing three-dimensional information of the unitary component, converting the three-dimensional information into a plurality of slices, and successively forming each slice of the unitary component with an additive process. After the step of successively forming, the moisture sensor of the unitary component includes a first conductive lead and a second conductive lead. The first and second conductive leads each have a plurality of conductive fingers. The plurality of conductive fingers of the first conductive lead is interdigitated with the plurality of conductive fingers of the second conductive lead.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
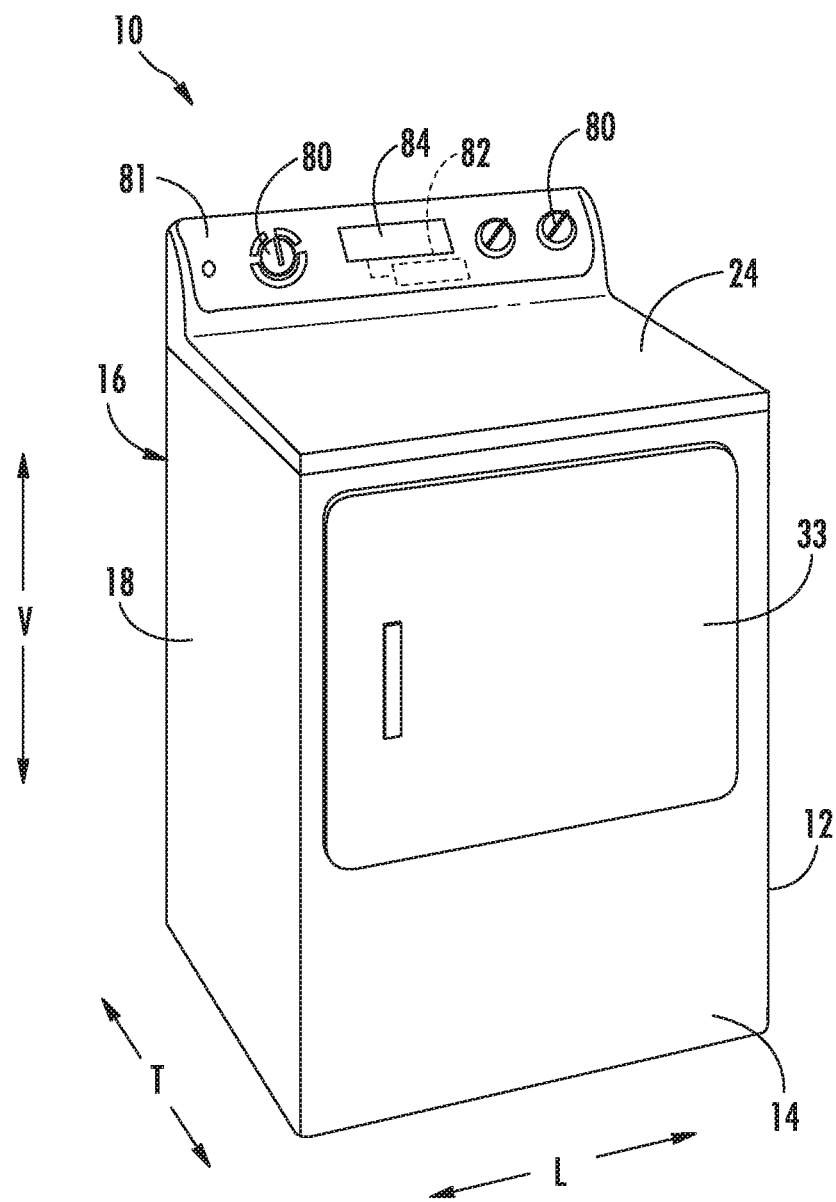
FIG. 1 provides a perspective view of a dryer appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
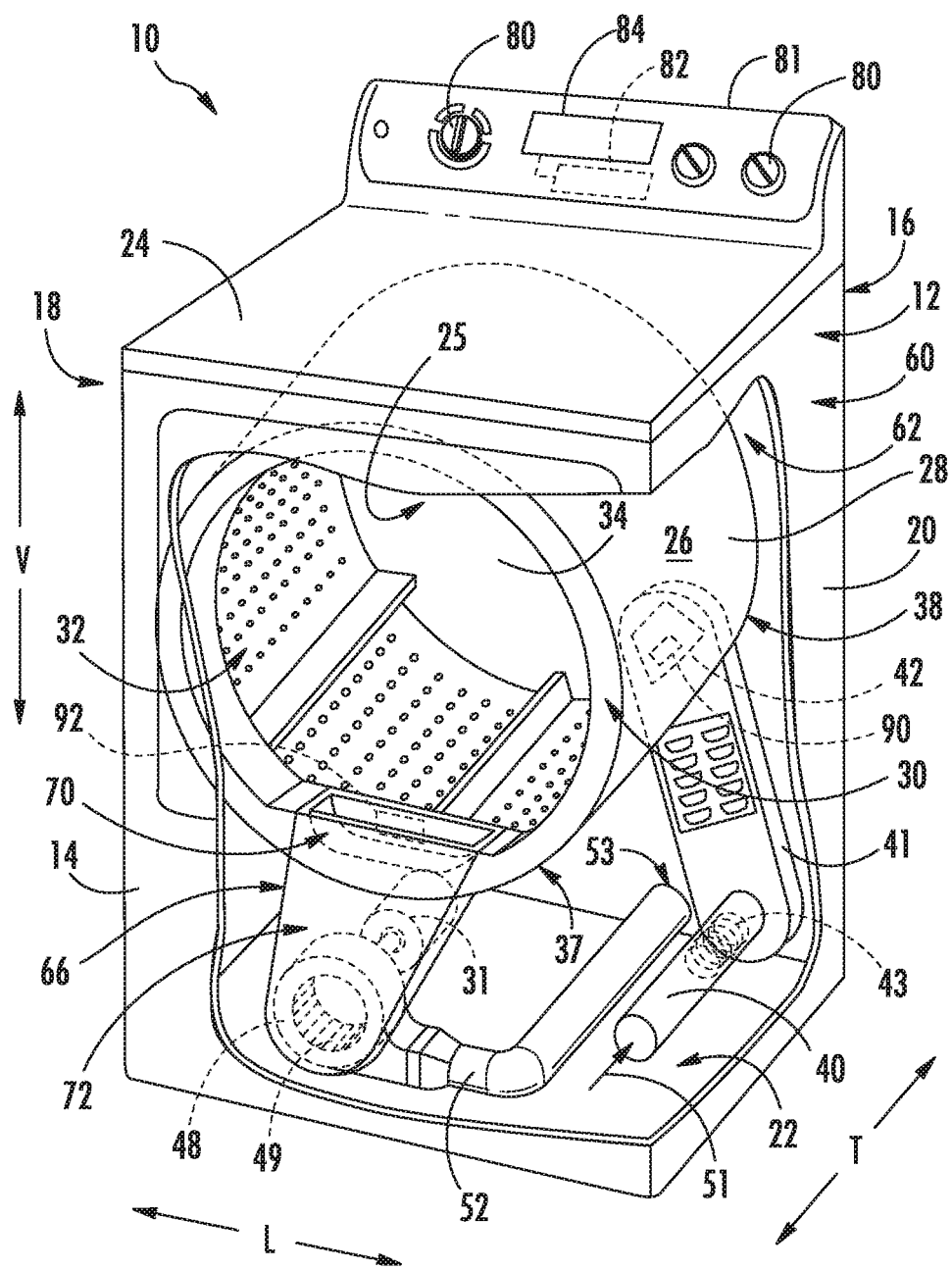
FIG. 2 provides a perspective view of the exemplary dryer appliance of FIG. 1 with portions of a cabinet of the exemplary dryer appliance removed to reveal certain components of the exemplary dryer appliance.

FIG. 1 illustrates a dryer appliance 10 according to an exemplary embodiment of the present subject matter. FIG. 2 provides another perspective view of dryer appliance 10 with a portion of a cabinet or housing 12 of dryer appliance 10 removed in order to show certain components of dryer appliance 10. While described in the context of a specific embodiment of dryer appliance 10, using the teachings disclosed herein it will be understood that dryer appliance 10 is provided by way of example only. Other dryer appliances having different appearances and different features may also be utilized with the present subject matter as well. Dryer appliance 10 defines a vertical direction V, a lateral direction L, and a transverse direction T. The vertical direction V, lateral direction L, and transverse direction T are mutually perpendicular and form and orthogonal direction system.

Cabinet 12 includes a front panel 14, a rear panel 16, a pair of side panels 18 and 20 spaced apart from each other by front and rear panels 14 and 16, a bottom panel 22, and a top cover 24. These panels and cover collectively define an external surface 60 of cabinet 12 and an interior 62 of cabinet 12. Within interior 62 of cabinet 12 is a drum or container 26. Drum 26 defines a chamber 25 for receipt of articles, e.g., clothing, linen, etc., for drying. Drum 26 extends between a front portion 37 and a back portion 38, e.g., along the transverse direction T. In exemplary embodiments, drum 26 is rotatable, e.g., about an axis that is parallel to the transverse direction T, within cabinet 12.

Drum 26 is generally cylindrical in shape, having an outer cylindrical wall or cylinder 28 and a front flange or wall 30 that may define an entry 32 of drum 26, e.g., at front portion 37 of drum 26, for loading and unloading of articles into and out of chamber 25 of drum 26. Drum 26 also includes a back or rear wall 34, e.g., at back portion 38 of drum 26. Rear wall 34 of drum 26 may be fixed relative to cabinet 12, e.g., such that cylinder 28 of drum 26 rotates on rear wall 34 of drum 26 during operation of dryer appliance 10.

A motor 31 may be in mechanical communication with a blower 48 such that motor 31 rotates a blower fan 49 of blower 48. Blower 48 is configured for drawing air through chamber 25 of drum 26, e.g., in order to dry articles located therein, as discussed in greater detail below. In alternative exemplary embodiments, dryer appliance 10 may include an additional motor (not shown) for rotating fan 49 of blower 48 independently of drum 26.

Drum 26 may be configured to receive heated air that has been heated by a heating assembly 40, e.g., in order to dry damp articles disposed within chamber 25 of drum 26. Heating assembly 40 includes a heater 43, such as a gas burner or an electrical resistance heating element, for heating air. As discussed above, during operation of dryer appliance 10, motor 31 rotates fan 49 of blower 48 such that blower 48 draws air through chamber 25 of drum 26. In particular, ambient air enters heating assembly 40 via an entrance 51 due to blower 48 urging such ambient air into entrance 51. Such ambient air is heated within heating assembly 40 and exits heating assembly 40 as heated air. Blower 48 draws such heated air through inlet duct 41 to drum 26. The heated air enters drum 26 through an outlet 42 of duct 41 positioned at rear wall 34 of drum 26.

Within chamber 25, the heated air can remove moisture, e.g., from damp articles disposed within chamber 25. This internal air in turn flows from chamber 25 through an outlet assembly 64 positioned within interior 62. Outlet assembly 64 includes a vent duct 66, blower 48, and an exhaust conduit 52. Exhaust conduit 52 is in fluid communication with vent duct 66 via blower 48. During a dry cycle, internal air flows from chamber 25 through vent duct 66 to blower 48 and through blower 48 to exhaust conduit 52. The internal air is exhausted from dryer appliance 10 via exhaust conduit 52.

In exemplary embodiments, vent duct 66 can include a filter portion 70 and an exhaust portion 72. Exhaust portion 72 may be positioned downstream of filter portion 70 (in the direction of flow of the internal air). A screen filter of filter portion 70 (which may be removable) traps lint and other particulates as the internal air flows therethrough. The internal air may then flow through exhaust portion 72 and blower 48 to exhaust conduit 52. After the clothing articles have been dried, the clothing articles are removed from drum 26 via entry 32. A door 33 provides for closing or accessing drum 26 through entry 32.

One or more selector inputs 80, such as knobs, buttons, touchscreen interfaces, etc., may be provided on a cabinet backsplash 81 and in communication with a processing device or controller 82. Signals generated in controller 82 operate motor 31 and heating assembly 40, including heater 43, in response to the position of selector inputs 80. Additionally, a display 84, such as an indicator light or a screen, may be provided on cabinet backsplash 82. Display 84 may be in communication with controller 82, and may display information in response to signals from controller 82. As used herein, "processing device" or "controller" may refer to one or more microprocessors or semiconductor devices and is not restricted necessarily to a single element. The processing device can be programmed to operate dryer appliance 10. The processing device may include, or be associated with, one or more memory elements such as e.g., electrically erasable, programmable read only memory (EEPROM).

In some embodiments, dryer appliance 10 may additionally include one or more sensors. For example, dryer appliance 10 may include one or more temperature sensors 90. Temperature sensor 90 is operable to measure internal temperatures in dryer appliance 10. In some embodiments, for example, temperature sensor 90 may be disposed in inlet duct 41, such as at outlet 42 of inlet duct 41, which corresponds to an inlet to drum 26. Additionally or alternatively, for example, temperature sensor 90 may be disposed in drum 26, such as in chamber 25 thereof, at an outlet of drum 26 such as in vent duct 66, or in any other suitable location within dryer appliance 10. Temperature sensors 90 may be in communication with controller 82, and may transmit readings to controller 82 as required or desired.

Figure 3:
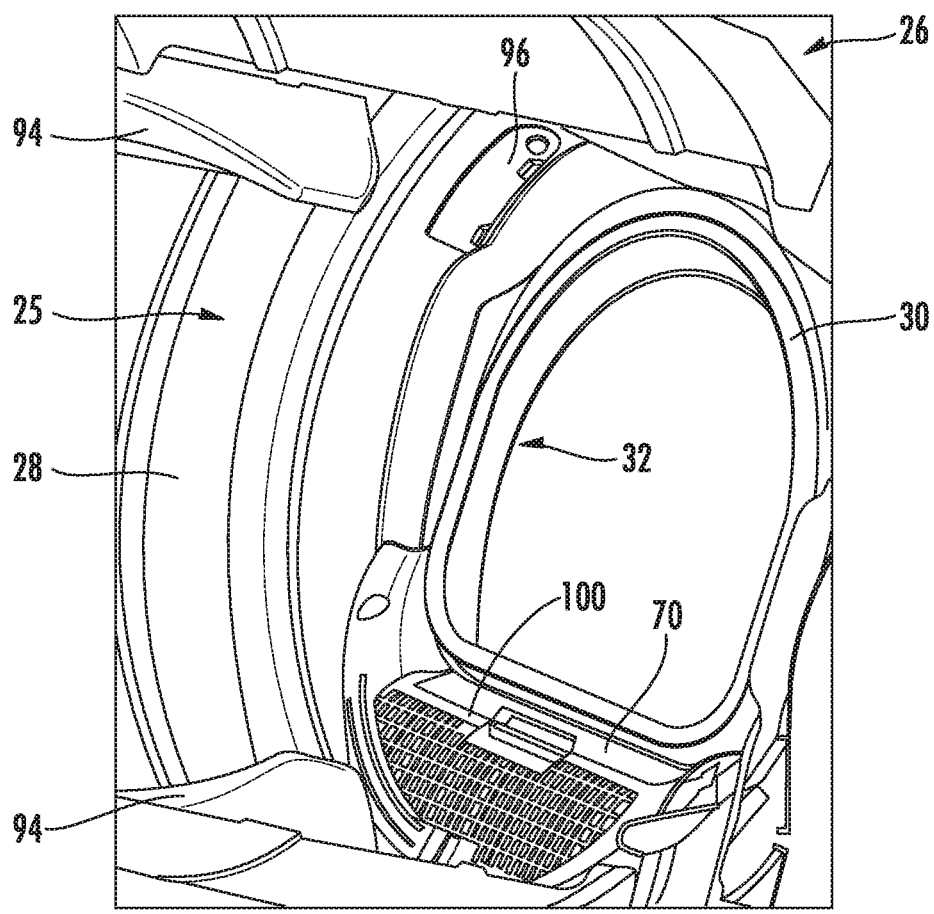
FIG. 3 provides a partial, perspective view of a drying chamber of the exemplary dryer appliance of FIG. 1.

Dryer appliance 10 may further include, for example, a dampness or moisture sensor 92. Moisture sensor 92 is operable to measure the dampness or moisture content of articles within chamber 25 during operation of dryer appliance 10. In particular, moisture sensor 92 may measure voltages associated with dampness or moisture content within the clothing, as is generally understood. In FIG. 3, moisture sensor 92 is shown disposed on wall 30 proximate filter portion 70. In alternative exemplary embodiments, moisture sensor 92 may be disposed at any other suitable location within dryer appliance 10, e.g., on cylinder 28, rear wall 34, etc. Moisture sensor 92 may be in communication with controller 82, and may transmit readings to controller 82 as required or desired.

Figure 4:
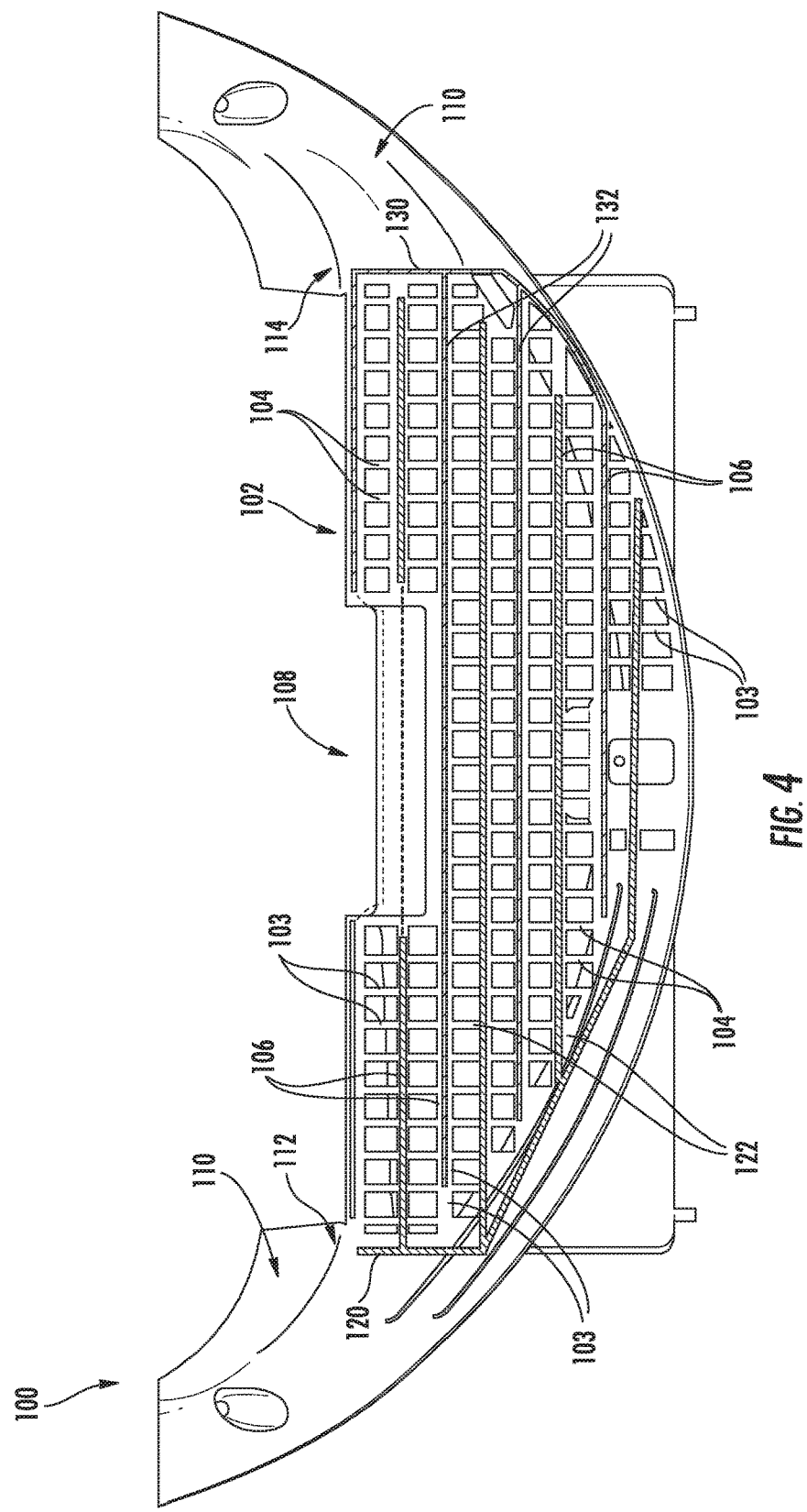
FIG. 4 provides an elevation view of a vent grill of the exemplary dryer appliance of FIG. 1.

FIG. 3 provides a partial, perspective view of chamber 25 of dryer appliance 10. FIG. 4 provides an elevation view of vent grill 100 of dryer appliance 10. As may be seen in FIG. 3, vent grill 100 is positioned at front portion 37 of drum 26 and, e.g., forms part of wall 30 below opening 32. Vent grill 100 is positioned at or adjacent chamber 25 such that air in chamber 25 is flowable through vent grill 100, e.g., to filter portion 70 behind vent grill 100.

Turning now to FIG. 4, vent grill 100 includes a mesh or grating 102. Grating 102 defines openings that permit fluid flow through vent grill 100, e.g., from chamber 25 through a lint filter into vent duct 66 as discussed above. In particular, grating 102 may include a plurality of elongated members 103 that are connected or mounted to each other to form grating 102. For example, grating 102 may include a plurality of vertical elongated members 104 and a plurality of lateral elongated members 106. Vertical members 104 extend along the vertical direction V and are distributed or spaced apart from one another along the lateral direction L. Conversely, lateral members 106 extend along the lateral direction L and are distributed or spaced apart from one another along the vertical direction V. Vertical members 104 and lateral members 106 are formed with one other to form grating 102. As an example, vertical and lateral members 104, 106 may be formed of or with a single, continuous piece of material, such as plastic.

Portions of moisture sensor 92 are formed with or on vent grill 100. As shown in FIG. 4, moisture sensor 92 included first conductive lead 120 and a second conductive lead 130. First and second conductive leads 120, 130 are additively formed with grating 104 such that first and second conductive leads 120, 130 do not contact each other on grating 104. By separating first and second conductive leads 120, 130 on vent grill 100, clothing with chamber 25 may bridge first and second conductive leads 120, 130 in order to close a circuit coupled to first and second conductive leads 120, 130. In such a manner, a moisture content of the clothing may be measured with moisture sensor 92, as will be under stood by those skilled in the art.

First and second conductive leads 120, 130 of moisture sensor 92 may be positioned on or at an outer surface 110 of vent grill 100 such that first and second conductive leads 120, 130 face chamber 25 on vent grill 100. In particular, first and second conductive leads 120, 130 may be formed on vent grill 100 such that outer surfaces of first and second conductive leads 120, 130 are flush with outer surface 110 of vent grill 100. In such a manner, snagging of clothing within chamber 25 on first and second conductive leads 120, 130 may be limited or prevented.

As shown in FIG. 4, first conductive lead 120 includes a plurality of conductive fingers 122, and second conductive lead 130 also includes a plurality of conductive fingers 132. Conductive fingers 122 of first conductive lead 120 are interdigitated with conductive fingers 132 of second conductive lead 130 on vent grill 100, e.g., on grating 102. For example, grating 102 may extend between a first side portion 112 and a second side portion 114, e.g., along the lateral direction L. Conductive fingers 122 of first conductive lead 120 may extend from first side portion 112 of grating 104 towards second side portion 114 of grating 104, and, e.g., a respective one of conductive fingers 132 of second conductive lead 130 may be positioned between each adjacent pair of conductive fingers 122 of first conductive lead 120. Conversely, conductive fingers 132 of second conductive lead 130 may extend from second side portion 114 of grating 104 towards first side portion 112 of grating 104, and, e.g., a respective one of conductive fingers 122 of first conductive lead 120 may be positioned between each adjacent pair of conductive fingers 132 of second conductive lead 130.

Each conductive finger 122 of first conductive lead 120 and each conductive finger 132 of second conductive lead 130 may be positioned or formed on a respective one of lateral members 106. Thus, conductive fingers 122 of first conductive lead 120 and conductive fingers 132 of second conductive lead 130 may be spaced apart from each other along the vertical direction V on lateral members 106, e.g., such that conductive fingers 122 of first conductive lead 120 and conductive fingers 132 of second conductive lead 130 are consecutively distributed between or adjacent one another along the vertical direction V on lateral members 106, as shown in FIG. 4.

In alternative exemplary embodiments, each conductive finger 122 of first conductive lead 120 and each conductive finger 132 of second conductive lead 130 may be positioned or formed on a respective one of vertical members 104. Thus, conductive fingers 122 of first conductive lead 120 and conductive fingers 132 of second conductive lead 130 may be spaced apart from each other along the lateral direction L on vertical members 104, e.g., such that conductive fingers 122 of first conductive lead 120 and conductive fingers 132 of second conductive lead 130 are consecutively distributed between or adjacent one another along the lateral direction L on vertical members 104. Other suitable distributions of conductive fingers 122 of first conductive lead 120 and conductive fingers 132 of second conductive lead 130 on vertical members 104 and/or lateral members 106 may be provided as well using the teachings disclosed herein.

Vent grill 100 may be integrally formed with moisture sensor 92, e.g., first and second conductive leads 120, 130 of moisture sensor 92. Thus, vent grill 100 and first and second conductive leads 120, 130 of moisture sensor 92 are connected or unitary with one another, e.g., such that vent grill 100 and first and second conductive leads 120, 130 of moisture sensor 92 are constructed of or with a continuous piece of material. For example, vent grill 100 may be formed of or with a single, continuous non-conductive material, such as a plastic, and first and second conductive leads 120, 130 of moisture sensor 92 may be a continuous metal lead formed with the non-conductive material of vent grill 100.

An exemplary method for forming first and second conductive leads 120, 130 of moisture sensor 92 on a component of dryer appliance 10 is discussed in greater detail below. As an example, the following method may be utilized to form first and second conductive leads 120, 130 of moisture sensor 92 on vent cover 100, as shown in FIG. 4. Thus, the method is discussed in greater detail below in the context of vent cover 100. However, it should be understood that the method may be used to form first and second conductive leads 120, 130 of moisture sensor 92 on any suitable component of dryer appliance. For example, turning back to FIG. 3, the following method may be used to form first and second conductive leads 120, 130 of moisture sensor 92 on a baffle 94 on drum 26, a lint screen (not shown) or a light cover 96 on front wall 30. The method described below may assist with formation of first and second conductive leads 120, 130 of moisture sensor 92 on vent cover 100. The method may fabricate first and second conductive leads 120, 130 of moisture sensor 92 on vent cover 100 such that vent cover 100 is a unitary vent cover, e.g., such that vent cover 100 is formed of a continuous piece of plastic, metal and/or other suitable materials.

Vent cover 100 may be formed using an additive process, such as Fused Deposition Modeling (FDM), Selective Laser Sintering (SLS), Stereolithography (SLA), Digital Light Processing (DLP), Direct Metal Laser Sintering (DMLS), Laser Net Shape Manufacturing (LNSM), electron beam sintering, laser direct structuring (LDS) and other known processes. An additive process fabricates plastic or metal components using three-dimensional information, for example a three-dimensional computer model, of the component. The three-dimensional information is converted into a plurality of slices, each slice defining a cross section of the component for a predetermined height of the slice. The component is then "built-up" slice by slice, or layer by layer, until finished.

Accordingly, a three-dimensional information of vent cover 100 is determined. As an example, a model or prototype of vent cover 100 may be scanned to determine the three-dimensional information of vent cover 100. As another example, a model of vent cover 100 may be constructed using a suitable CAD program to determine the three-dimensional information of vent cover 100. The three-dimensional information is then converted into a plurality of slices that each defines a cross-sectional layer of vent cover 100. As an example, the three-dimensional information may be divided into equal sections or segments, e.g., along a central (e.g., vertical) axis of vent cover 100 or any other suitable axis. Thus, the three-dimensional information may be discretized, e.g., in order to provide planar cross-sectional layers of vent cover 100.

Vent cover 100 is then fabricated using the additive process, or more specifically each layer is successively formed, e.g., by fusing or polymerizing a plastic using laser energy or heat. The layers may have any suitable size. For example, each layer may have a size between about five ten-thousandths of an inch and about one thousandths of an inch. Vent cover 100 may be fabricated using any suitable additive manufacturing machine. For example, any suitable laser sintering machine, inkjet printer or laserjet printer may be used.

Utilizing the above method, vent cover 100 may have fewer components and/or joints than known vent covers with separate moisture sensors bars. Specifically, vent cover 100 may require fewer components because vent cover 100 and first and second conductive leads 120, 130 of moisture sensor 92 may be a continuous piece of plastic and/or metal, e.g., rather than multiple pieces of plastic or metal joined or connected together. In addition, the method may permit formation of interlaced conductive fingers between first and second conductive leads 120, 130 of moisture sensor 92, e.g., on grating 102. Also, vent cover 100 may be less prone to fluid leakage and/or be stronger when formed with in the manner described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dryer appliance, comprising:
    a cabinet;
    a drum rotatably mounted within the cabinet, the drum defining a drying chamber;
    a vent grill positioned at the drying chamber of the drum such that air in the drying chamber of the drum is flowable through the vent grill, the vent grill comprising a grating; and
    a moisture sensor comprising a first conductive lead and a second conductive lead, the first and second conductive leads additively formed with the grating of the vent grill such that the first and second conductive leads do not contact each other on the grating, the first and second conductive leads positioned on the grating of the vent grill such that one or more articles for drying within the drying chamber of the drum contact the first and second conductive leads when the drum rotates and tumbles the one or more articles for drying within the drying chamber of the drum,
    wherein the vent grill is constructed of a non-conductive material where the moisture sensor contacts the vent grill, and the non-conductive material comprises plastic.

2. The dryer appliance of claim 1, wherein the first and second conductive leads each comprise a plurality of conductive fingers, the plurality of conductive fingers of the first conductive lead interdigitated with the plurality of conductive fingers of the second conductive lead.

3. The dryer appliance of claim 2, wherein the grating extends between a first side portion and a second side portion, the first conductive lead of the moisture sensor extending from the first side portion of the grating towards the second side portion of the grating, the second conductive lead of the moisture sensor extending from the second side portion of the grating towards the first side portion of the grating.

4. The dryer appliance of claim 2, wherein the grating comprises a plurality of lateral elongated members, each finger of the plurality of conductive fingers of the first conductive lead and each finger of the plurality of conductive fingers of the second conductive lead positioned on a respective lateral elongated member of the plurality of lateral elongated members.

5. The dryer appliance of claim 2, wherein the grating comprises a plurality of vertical elongated members, each finger of the plurality of conductive fingers of the first conductive lead and each finger of the plurality of conductive fingers of the second conductive lead positioned on a respective vertical elongated member of the plurality of vertical elongated members.

6. The dryer appliance of claim 1, wherein the vent grill is positioned at a front of the drum.

7. The dryer appliance of claim 1, wherein the first and second conductive leads of the moisture sensor face the drying chamber of the drum on the vent grill.

8. A dryer appliance, comprising:
    a cabinet;
    a drum rotatably mounted within the cabinet, the drum defining a drying chamber;
    a vent grill positioned at the drying chamber of the drum such that air in the drying chamber of the drum is flowable through the vent grill, the vent grill comprising a grating; and
    a moisture sensor comprising a first conductive lead and a second conductive lead, the first and second conductive leads additively formed with the grating of the vent grill such that the first and second conductive leads do not contact each other on the grating, the first and second conductive leads positioned on the gating of the vent grill such that one or more articles for drying within the drying chamber of the drum contact the first and second conductive leads when the drum rotates and tumbles the one or more articles for drying within the drying chamber of the drum,
    wherein the first and second conductive leads each comprise a plurality of conductive fingers, the plurality of conductive fingers of the first conductive lead interdigitated with the plurality of conductive fingers of the second conductive lead, and
    wherein the grating comprises a plurality of lateral elongated members, each finger of the plurality of conductive fingers of the first conductive lead and each finger of the plurality of conductive fingers of the second conductive lead positioned on a respective lateral elongated member of the plurality of lateral elongated members.

9. The dryer appliance of claim 8, wherein the vent grill is positioned at a front of the drum.

10. The dryer appliance of claim 8, wherein the vent grill is constructed of a non-conductive material where the moisture sensor contacts the vent grill.

11. The dryer appliance of claim 10, wherein the non-conductive material comprises plastic.

12. The dryer appliance of claim 8, wherein the first and second conductive leads of the moisture sensor face the drying chamber of the drum on the vent grill.

13. A dryer appliance, comprising:
a cabinet;
a drum rotatably mounted within the cabinet, the drum defining a drying chamber;
a vent grill positioned at the drying chamber of the drum such that air in the drying chamber of the drum is flowable through the vent grill, the vent grill comprising a grating; and
a moisture sensor comprising a first conductive lead and a second conductive lead, the first and second conductive leads additively formed with the grating of the vent grill such that the first and second conductive leads do not contact each other on the grating, the first and second conductive leads positioned on the grating of the vent grill such that one or more articles for drying within the drying chamber of the drum contact the first and second conductive leads when the drum rotates and tumbles the one or more articles for drying within the drying chamber of the drum,
wherein the first and second conductive leads each comprise a plurality of conductive fingers, the plurality of conductive fingers of the first conductive lead interdigitated with the plurality of conductive fingers of the second conductive lead, and
wherein the grating comprises a plurality of vertical elongated members, each finger of the plurality of conductive fingers of the first conductive lead and each finger of the plurality of conductive fingers of the second conductive lead positioned on a respective vertical elongated member of the plurality of vertical elongated members.

14. The dryer appliance of claim 13, wherein the vent grill is positioned at a front of the drum.

15. The dryer appliance of claim 13, wherein the vent grill is constructed of a non-conductive material where the moisture sensor contacts the vent grill.

16. The dryer appliance of claim 15, wherein the non-conductive material comprises plastic.

17. The dryer appliance of claim 13, wherein the first and second conductive leads of the moisture sensor face the drying chamber of the drum on the vent grill.

* * * * *